Patented Feb. 27, 1945

2,370,494

UNITED STATES PATENT OFFICE 2,370,494

MANUFACTURE OF ALKANOIC ACIDS

Louis Schmerling, Riverside, Ill., assignor to Universal Oil Products Company, Chicago, Ill., a corporation of Delaware No Drawing. Application November 9, 1942, Serial No. 465,096

5 Claims. (Cl. 260—540)

The present invention is concerned with a process for the synthesis of acids having a general structure R—COOH in which R represents a saturated alkyl radical.

The invention is more specifically concerned with a new type of process in which isoparaffinic hydrocarbons are reacted with unsaturated aliphatic carboxylic acids to form saturated alkyl carboxylic acids of higher molecular weight.

In one specific embodiment the present invention comprises a process for the manufacture of saturated alkyl mono-carboxylic acids which comprises interacting isoparaffin hydrocarbons and unsaturated aliphatic carboxylic acids in the presence of catalysts of the Friedel-Crafts type.

The present process involves a new reaction which may be looked upon, from one viewpoint, as an alkylation of isoparaffin hydrocarbons with alkenyl carboxylic acids. This group of acids includes those tabulated below:

| Acid | Formula | Melting point, °C | Boiling point, °C |
|---|---|---|---|
| Acrylic | CH$_2$=CHCOOH | 7 | 140 |
| Crotonic | CH$_3$CH=CHCOOH | 72 | 182 |
| Isocrotonic | CH$_2$=CHCH$_2$COOH | 15 | 172 |
| Angelic | CH$_3$CH=C—COOH<br>      \|<br>     CH$_3$ | 45 | 185 |
| Tiglic | CH$_2$=CHC—COOH<br>       \|<br>      CH$_3$<br>       H | 65 | 198 |

In accordance with the present invention reaction is brought about between isoparaffins and acids of the above character or, alternatively, their esters.

The isoparaffin hydrocarbons include a large group, the simplest member of which is isobutane, the number of possible isomers increasing rapidly with molecular weight in the series and including such compounds as isopentane, isohexanes such as methyl pentanes and dimethylbutanes, and a large number of isoheptanes including methyl hexanes, dimethylpentanes, and the compound, 2,2,3-trimethylbutane. The reactivity of these hydrocarbons with the unsaturated carboxylic acids apparently depends upon the presence of tertiary carbon atoms.

The reactions involved in the present process are typified by that occurring between isobutane and acrylic acid to yield various heptanoic acids, these acids being formed by the interaction of the lowest molecular weight representatives of the two groups of compounds which are reacted according to the process of the present invention. A possible reaction which may take place between these two compounds is shown in the following equation in which structural formulas are used:

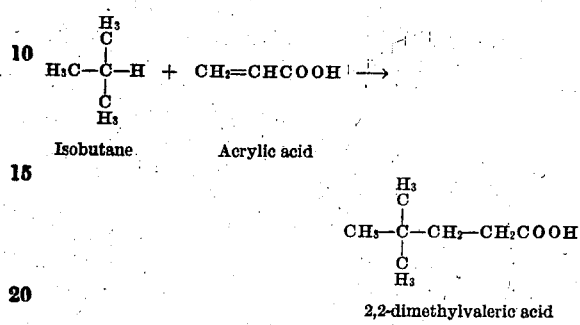

The formula on the right hand side of the above equation may represent a possible reaction product although this particular compound was not isolated from the mixture of isoheptanoic acids.

The principal reactions involved are those in which the unsaturated acid adds to the tertiary carbon atom but other reactions are possible particularly in the case of the higher molecular weight unsaturated acids in which the double bond is present in various positions.

The reactions of the present process are preferably brought about in the presence of the more reactive Friedel-Crafts type catalysts such as, for example, aluminum chloride, aluminum bromide, zinc chloride, ferric chloride, zirconium chloride, boron fluoride, etc. Reactions in the presence of these halide catalysts are usually accelerated by the presence of minor amounts of hydrogen halides. The temperature and pressure conditions most favorable to the production of the desired iso-alkanoic acids will vary with the reactants and the particular catalysts employed but, in general, temperatures from approximately room temperature up to 150° C. may be employed when good yields are obtained. High yields of the desired alkanoic acids are favored by relatively high ratios of isoparaffin to unsaturated acid and by the use of considerable amounts of metal halide catalyst in relation to the amount of unsaturated acid.

Batch operations may be conducted by charging proportioned amounts of isoparaffin, unsaturated acid, metal halide catalyst and hydrogen halide to a pressure vessel and heating to an optimum temperature determined by trial while the pressure is allowed to rise to any point which corresponds to the best temperature found for the reaction. After the reaction has ceased, the pressure vessel is cooled and may be vented to remove light gaseous products and the contents of the vessel separated into a layer of spent catalyst and products which are then further separated by fractionation or the employment of individual reactions characteristic of the compounds formed. Separated unreacted substances may be recovered, reproportioned and further reacted.

Continuous operations may be practiced by passing proportioned mixtures of isoparaffin, unsaturated acid and a hydrogen halide through a bed of granular metal halide at selected temperature, pressure and flow conditions with subsequent continuous fractionation and recovery of the desired products and recycling of unreacted materials. It is within the scope of the present invention to employ supported metal halide catalysts in such operations such as, for example, prepared composites which have been produced by adding aluminum chloride to such granular materials as activated carbons, bauxites, and various other refractory materials of a siliceous or oxide character. The temperatures employed in continuous operations may be higher and the times of contact somewhat lower than the conditions employed in batch operation to produce the same results. Obviously, in commercial operations where capacities are of primary consideration, the continuous method of operation will be preferred.

The compounds formed by the interaction of isoparaffins and unsaturated acids by the present process are useful in themselves in many ways and also as intermediate compounds in the preparation of other synthetic products. For example, they may be used as starting materials for the production of corresponding ketones and esters having particular properties and may be converted to hydrocarbons by removal of carbon dioxide by heating with alkaline earth metal hydroxides. In short, they are capable of undergoing any of the known reactions of mono-carboxylic acids to form derivatives.

The following example is given to illustrate the results obtainable in one particular instance involving the interaction of an isoparaffin and an unsaturated carboxylic acid. However, the data are more or less specific and it is not intended that the example thus introduced should act to correspondingly limit the proper scope of the invention.

Mixtures of crotonic acid, isobutane and aluminum chloride were added to a glass-lined pressure vessel, and a minor amount of hydrogen chloride was added. The vessel was then heated at different temperatures for periods of several hours and products separated and identified. The following tabulation shows the significant data obtained in two runs:

| | Run No. 1 | Run No. 2 |
|---|---|---|
| Reactants, parts by weight: | | |
| Crotonic acid | 10 | 15 |
| Isobutane | 117 | 101 |
| Aluminum chloride | 30 | 30 |
| Hydrogen chloride | 3 | 3 |
| Temperature, °C | 50 | 100 |
| Pressure, atmospheres: | | |
| Initial | | |
| Maximum | | 22 |
| Final | | 3 |
| Operation of heating, hours | 4 | 4 |
| Products, parts by weight: | | |
| Condensible gas | | 94 |
| Reaction products | 41 | 48 |

From the analysis of the products from run No. 1, it was indicated that the temperature was too low for extensive reactions to occur. The products from run No. 2 were treated with water to separate metal halide and leave an oily upper layer. The upper layer was shaken out with ether, washed further with water and extracted with dilute caustic soda to form alkali metal salts of the acids formed. Evaporation of the residual ether yielded 4.5 parts by weight of the product which consisted of a mixture of ketones and esters of the acids. The acidification of the alkaline extract yielded a mixture of octanoic acids boiling within the range of 205–215° C. and having a molecular weight of 150. The octanoic acids were identified by carbon-hydrogen analyses and their boiling range indicated that they were of an iso character since the boiling point of normal octanoic acid (caprylic acid) is 285° C.

I claim as my invention:

1. A process for the manufacture of alkanoic acids which comprises interacting an isoparaffin hydrocarbon and an unsaturated aliphatic carboxylic acid in the presence of a catalyst of the Friedel-Crafts type.

2. A process for the manufacture of alkanoic acids which comprises interacting an isoparaffin hydrocarbon and an unsaturated aliphatic carboxylic acid in the presence of a metal halide-hydrogen halide catalyst of the Friedel-Crafts type.

3. A process for the manufacture of alkanoic acids which comprises interacting an isoparaffin hydrocarbon and an unsaturated aliphatic carboxylic acid in the presence of aluminum chloride and hydrogen chloride.

4. A process for the manufacture of alkanoic acids comprising a substantial proportion of isoheptanoic acids which comprises interacting isobutane and acrylic acid in the presence of a metal halide-hydrogen halide catalyst of the Friedel-Crafts type.

5. A process for the manufacture of alkanoic acids comprising a substantial proportion of iso-octanoic acids which comprises interacting isobutane and a crotonic acid in the presence of a metal halide-hydrogen halide catalyst of the Friedel-Crafts type.

LOUIS SCHMERLING.